US012528159B2

(12) United States Patent
Kuter-Arnebeck et al.

(10) Patent No.: US 12,528,159 B2
(45) Date of Patent: Jan. 20, 2026

(54) MODULAR VISE

(71) Applicant: Snap-on Incorporated, Kenosha, WI (US)

(72) Inventors: Ottoleo Kuter-Arnebeck, Kenosha, WI (US); Nicholas H. Weir, Kenosha, WI (US); Benjamin T. Schulz, Racine, WI (US); Rupak K. Paul, Lake Geneva, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/515,584

(22) Filed: Nov. 21, 2023

(65) Prior Publication Data

US 2024/0082985 A1 Mar. 14, 2024

Related U.S. Application Data

(63) Continuation of application No. 18/094,577, filed on Jan. 9, 2023, now Pat. No. 11,872,672, which is a continuation of application No. 17/397,451, filed on Aug. 9, 2021, now Pat. No. 11,660,728.

(51) Int. Cl.
*B25B 1/00* (2006.01)
*B25B 1/02* (2006.01)
*B25B 1/08* (2006.01)

(52) U.S. Cl.
CPC .................. *B25B 1/08* (2013.01); *B25B 1/02* (2013.01)

(58) Field of Classification Search
CPC .... B25B 1/00; B25B 1/08; B25B 1/02; B25B 5/00; B25B 5/14
See application file for complete search history.

(56) References Cited

U.S. PATENT DOCUMENTS

| | | | |
|---|---|---|---|
| 42,236 | A | 4/1864 | Stephens |
| 63,929 | A | 4/1867 | More |
| 164,291 | A | 6/1875 | Gleason et al. |
| 227,582 | A | 5/1880 | Riley |
| 375,537 | A | 12/1887 | Crawford |
| 375,538 | A | 12/1887 | Crawford |

(Continued)

FOREIGN PATENT DOCUMENTS

| | | | |
|---|---|---|---|
| CN | 2437456 | Y | 7/2001 |
| CN | 2566984 | Y | 8/2003 |

(Continued)

OTHER PUBLICATIONS

Taiwan Office Action for corresponding TW Application No. 111129474 dated May 29, 2023, 11 pages.

(Continued)

*Primary Examiner* — Lee D Wilson
(74) *Attorney, Agent, or Firm* — Taft Stettinius & Hollister LLP

(57) ABSTRACT

A vise having a modular construction that allows for ease of manufacture, assembly, and changeover or replacement of wear items, such as gripping surfaces of jaws of the vise. The modular construction also provides for reduced weight of the vise compared to conventional cast type vises. The vise also incorporates quick adjustment features allowing for the vise to be easily rotated, a position and size of an opening of the jaws to be rapidly adjusted, and a clamping force applied with ease.

13 Claims, 11 Drawing Sheets

(56) References Cited

U.S. PATENT DOCUMENTS

| | | | | |
|---|---|---|---|---|
| 394,793 | A | 12/1888 | Stoecklin | |
| 454,693 | A | 6/1891 | Wies | |
| 496,498 | A | 5/1893 | Walker | |
| 669,605 | A | 3/1901 | Vernon | |
| 713,038 | A | 11/1902 | Zimerman | |
| 774,574 | A | 11/1904 | Fleischmann | |
| 781,285 | A | 1/1905 | Kincaid | |
| 993,181 | A | 5/1911 | Lewis | |
| 999,978 | A | 8/1911 | Fisher | |
| 1,181,821 | A | 5/1916 | Silvano | |
| 1,296,723 | A | 3/1919 | Winans | |
| 1,344,862 | A | 6/1920 | Eader | |
| 1,359,775 | A | 11/1920 | White | |
| 1,890,042 | A | 12/1932 | Morandi | |
| 2,362,707 | A | 11/1944 | Malmquist | |
| 2,565,965 | A | 8/1951 | Hartmann | |
| 2,605,660 | A | 8/1952 | Firth | |
| 2,619,138 | A | 11/1952 | Marler | |
| 2,620,694 | A | 12/1952 | Walfrid | |
| 2,690,088 | A | 9/1954 | Worth | |
| 2,734,409 | A | 2/1956 | Schum | |
| 2,838,948 | A | 6/1958 | Lassy | |
| 2,872,834 | A | 2/1959 | Chapman | |
| 3,341,190 | A | 9/1967 | Adamson | |
| 3,666,260 | A | 5/1972 | Myers | |
| 4,381,105 | A | 4/1983 | Goff et al. | |
| 4,437,654 | A | 3/1984 | Chiappetti | |
| 4,569,511 | A | 2/1986 | Bell | |
| 4,798,371 | A | 1/1989 | Wallisser | |
| 4,809,962 | A | 3/1989 | Lee | |
| 4,861,010 | A | 8/1989 | Neil | |
| 4,932,643 | A | 6/1990 | Rohm | |
| 4,971,301 | A | 11/1990 | Yang | |
| 5,150,888 | A | 9/1992 | Durfee | |
| 5,417,409 | A | 5/1995 | Reddell | |
| 5,941,513 | A * | 8/1999 | Moilanen | B25J 9/08 269/45 |
| 6,095,508 | A | 8/2000 | Mazingue | |
| 6,361,034 | B1 | 3/2002 | Wolfe | |
| 6,957,809 | B1 | 10/2005 | Ferrara | |
| 7,673,861 | B2 * | 3/2010 | Meholovitch | B25B 1/125 269/181 |
| 8,336,867 | B1 | 12/2012 | Warth | |
| 9,193,041 | B2 | 11/2015 | Huang | |
| 10,960,517 | B2 | 3/2021 | Hanlon | |
| 11,660,728 | B2 * | 5/2023 | Kuter-Arnebeck | B25B 1/22 269/229 |
| 11,872,672 | B2 * | 1/2024 | Kuter-Arnebeck | B25B 1/2489 |
| 2001/0015563 | A1 * | 8/2001 | Moilanen | B25B 5/087 294/203 |
| 2003/0234480 | A1 | 12/2003 | Thomas | |
| 2008/0029947 | A1 | 2/2008 | Meholovitch et al. | |
| 2013/0300048 | A1 | 11/2013 | Chen | |
| 2014/0246824 | A1 | 9/2014 | Fiegener et al. | |
| 2014/0361479 | A1 | 12/2014 | Zhang et al. | |
| 2017/0008155 | A1 | 1/2017 | Hanlon et al. | |
| 2021/0205960 | A1 | 7/2021 | Hanlon et al. | |
| 2023/0038808 | A1 * | 2/2023 | Kuter-Arnebeck | B25B 1/08 |
| 2023/0158641 | A1 * | 5/2023 | Kuter-Arnebeck | B25B 1/08 269/229 |
| 2024/0082985 | A1 * | 3/2024 | Kuter-Arnebeck | B25B 1/02 |

FOREIGN PATENT DOCUMENTS

| | | | |
|---|---|---|---|
| CN | 103072102 | A | 5/2013 |
| CN | 103659376 | B | 3/2014 |
| CN | 104108077 | A | 10/2014 |
| CN | 107263162 | A | 10/2017 |
| CN | 207309754 | U | 5/2018 |
| CN | 110052982 | A | 7/2019 |
| CN | 209919633 | | 1/2020 |
| DE | 297685 | | 5/1917 |
| DE | 313091 | | 7/1919 |
| DE | 313092 | | 7/1919 |
| DE | 3049462 | A1 | 7/1982 |
| EP | 0508569 | B | 9/1996 |
| FR | 494849 | | 9/1919 |
| GB | 121967 | | 12/1919 |
| KR | 19890007849 | | 7/1989 |
| KR | 20110063704 | A | 6/2011 |
| TW | 335748 | U | 7/1998 |
| TW | M307481 | U | 3/2007 |
| TW | M380194 | U | 5/2010 |
| TW | M382871 | U | 6/2010 |
| TW | M475336 | U | 4/2014 |
| TW | 201532743 | A | 9/2015 |
| WO | 0230622 | A2 | 4/2002 |
| WO | 2013125739 | A1 | 8/2013 |
| WO | 2017215404 | A1 | 12/2017 |

OTHER PUBLICATIONS

United Kingdom Combined Search and Examination Report for corresponding UK Application No. GB2311986.0, dated Nov. 30, 2023, 5 pages.

United Kingdom Intellectual Property Office, Search & Examination Report issued in corresponding Application No. GB2402221.2, dated Mar. 15, 2024, 8 pp.

Taiwanese Patent Office, Office Action issued in corresponding Application No. 112135107, dated Apr. 15, 2024, 10 pp.

UK Intellectual Property Office, Combined Search and Examination Report issued in corresponding Application No. GB2402221.2.

Taiwan Patent Office, First Office Action issued in the corresponding Application No. 113127511, dated Dec. 18, 2024, 15 pp.

Taiwan Patent Office, First Office Action issued in the corresponding Application No. 114109774, dated Jul. 14, 2025, 10 pp.

* cited by examiner

MODULAR VISE

CROSS REFERENCES TO RELATED APPLICATIONS

This application is a continuation of, and claims the benefit to, U.S. patent application Ser. No. 18/094,577, filed Jan. 9, 2023, which is a continuation of, and claims the benefit to, U.S. patent application Ser. No. 17/397,451, filed Aug. 9, 2021, the contents of which are incorporated herein by reference in their entirety.

TECHNICAL FIELD OF THE INVENTION

The present invention relates generally to tools. More specifically, the present invention relates to adjustable vises.

BACKGROUND OF THE INVENTION

Tools, such as, for example, vises or bench vises, are commonly used to securely hold an item or object, while work is performed on the object. For example, conventional vises are cast tools and include a screw type mechanism used to adjust a distance between opposing first and second jaws (also referred to as jaw opening) to clap or hold the object between the first and second jaws. However, this screw type mechanism can cause adjusting of the jaw opening to be slow when working with objects of different sizes or orientations.

Some conventional vises provide replaceable grippers on the jaws. However, these grippers are affixed to the respective jaws with screws or other fasteners that often become damaged or corrode, making replacement of the grippers difficult. Due to the cast nature of conventional vises, the conventional vises also tend to be large and heavy, which makes moving or manipulation of the vises cumbersome.

SUMMARY OF THE INVENTION

The present invention relates broadly to a vise having a modular construction that allows for ease of manufacture, assembly, and ease of changeover or replacement of wear items, such as gripping surfaces of jaws of the vise. The modular construction also provides for reduced weight of the vise, compared to conventional cast type vises. The vise also incorporates quick adjustment features allowing for the vise to be easily rotated, a position and size of an opening of the jaws to be rapidly adjusted, and a clamping force applied with ease. For example, the vise may include a quick adjustment mechanism that allows the jaws to clamp an object therebetween by actuating a cam that drives a gear face laterally, where the gear face engages and pulls a gear rack attached to a clamping face assembly. Further, the vise may include a rotation mechanism that allows the vise to be quickly and easily rotated.

In an embodiment, the present invention relates broadly to a vise having a body including first and second side portions. A slide extends into the body between the first and second side portions, and a toothed portion is coupled to the slide and faces in a first direction towards the first side portion. A first jaw portion is coupled to the body, and a second jaw portion is coupled to an end of the slide, wherein the slide is movable with respect to the body to adjust a distance between the first and second jaw portions. A cam and tooth block are disposed in the first side portion, wherein the tooth block faces in a second direction towards the toothed portion and engages the toothed portion, and wherein rotation of the cam in a first rotational direction cases movement of the tooth block linearly laterally with respect to the first side portion, and the movement of the tooth block causes movement of the slide into the body.

In an embodiment, the present invention relates broadly to a vise having a base plate, a cover plate coupled to the base plate, a gear ring disposed between the base plate and the cover plate, wherein the gear ring includes gear teeth extending inwardly from an inner surface of the gear ring. A lever including a gear stop with stop teeth is adapted to engage the gear teeth. An attachment portion is coupled to the gear ring and extends through the cover plate.

The vise also includes a body having first and second side portions respectively coupled to opposing sides of the attachment portion, wherein the attachment portion, gear ring, and body are rotatable together with respect to the base plate when the stop teeth are disengaged from the gear teeth. A slide extends into the body between the first and second side portions. A first jaw portion is coupled to the body, and a second jaw portion is coupled to an end of the slide, wherein the slide is movable with respect to the body to adjust a distance between the first and second jaw portions.

In an embodiment, the present invention relates broadly to a vise having a body including first and second side portions, and first and second rollers coupled to and extending between the first and second side portions. A slide extends into the body between the first and second side portions and between the first and second rollers. A first jaw portion is coupled to the body, and a second jaw portion is coupled to an end of the slide, wherein the slide is movable with respect to the body to adjust a distance between the first and second jaw portions.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
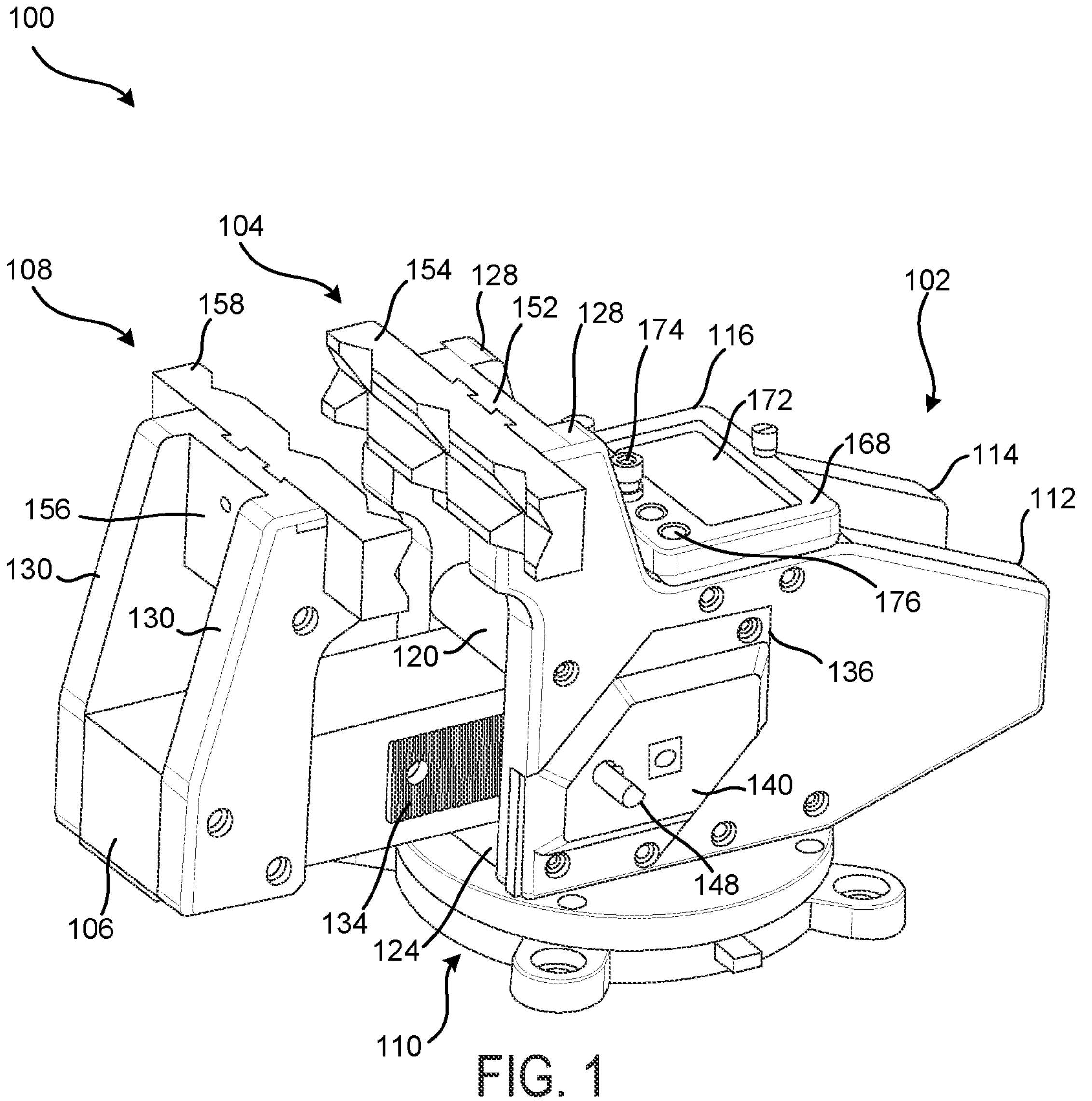
FIG. 1 is a perspective view of an exemplary vise, according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a vise having a modular construction that allows for ease of manufacture, assembly, and changeover or replacement of wear items, such as gripping surfaces of jaws of the vise. The modular construction also provides for reduced weight of the vise, compared to conventional cast type vises. The vise also incorporates quick adjustment features allowing the vise to be easily rotated, positioned and sizing of an opening between the jaws to be rapidly adjusted, and a clamping force applied with ease. For example, the vise may include a quick adjustment mechanism that allows the jaws to clamp an object therebetween by actuating a cam that drives a gear face laterally, where the gear face engages and pulls a gear rack attached to a clamping face assembly. Further, the vise may include a rotation mechanism that allows the vise to be quickly and easily rotated.

Referring to FIGS. 1-4, a vise 100 includes a body portion 102 with a first jaw portion 104, a slide 106 having a second jaw portion 108, and a base portion 110. The slide 106 is received in the body portion 102, and movable with respect to the body portion 102 to adjust a distance or opening between the first and second jaw portions 104, 108. This allows a user to adjust the opening between the first and second jaw portions 104, 108 to clamp an object between the first and second jaw portions 104, 108.

Figure 4:
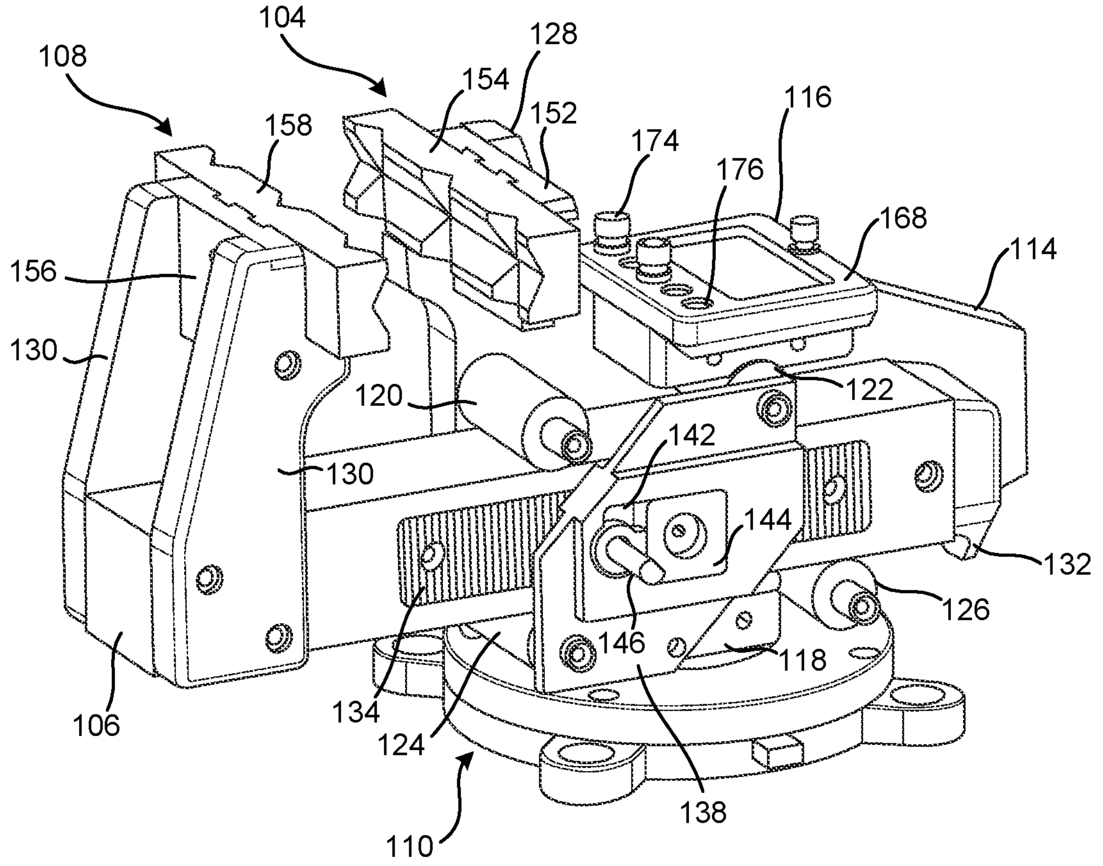
FIG. 4 is a perspective view of the vise of FIG. 1 with a side plate removed, according to an embodiment of the present invention.

Referring to FIGS. 1 and 4, the body portion 102 includes first and second side portions 112, 114, and a top portion 116. The first and second side portions 112, 114 are coupled to the base 110. For example, the first and second side portions 112, 114 are respectively coupled to opposing sides of an attachment portion 118 of the base 110 that projects upwardly from the base 110 (as described in further detail below). In an embodiment, the first and second side portions 112, 114 are respectively coupled to the attachment portion 118 via removable fasteners, such as, for example, screws, bolds, rivets, etc. This allows the base 110, and first and second side portions 112, 114, to be disassembled, and replacement of damaged or worn components.

The first and second side portions 112, 114 may also be coupled together via one or more rollers and/or bushings. For example, referring to FIG. 4, first, second, third, and fourth rollers 120, 122, 124, and 126 are disposed between the first and second side portions 112, 114. The first and second rollers 120, 122 may be disposed proximal to an upper side of the first and second side portions 112, 114, and the third and fourth rollers 124, 126 may be disposed proximal to a lower side of the first and second side portions 112, 114 (proximal to the base 110). In another embodiment, the rollers 120, 122, 124, and 126 may instead be bushings, such as, for example, rectilinear bushings.

The first and second side portions 112, 114 may also be coupled to the top portion 116 via removable fasteners, such as, for example, screws, bolds, rivets, etc. This allows the top portion 116 to be removed and replaced. For example, the top portion 116 may be a flat plate, a tray type portion, or other functional portion (as described in further detail below). The first and second side portions 112, 114 may also include first jaw mounting portions 128. The first jaw mounting portions 128 may include notches adapted to receive, position, and couple to modular jaws, brackets, or clamps (as described in further detail below).

The slide 106 may be received in the body 102, and disposed between the first and second side portions 112, 114. The slide 106 may also be disposed between the first and third rollers 124, 124 and between the second and fourth rollers 122, 126. The first, second, third, and fourth rollers 120, 122, 124, and 126 provide for smooth and easy movement of the slide 106 into and out of the body 102.

Second jaw mounting portions 130 may be coupled to an end of the slide 106. Similar to the first jaw mounting portions 128, the second jaw mounting portions 130 may include notches adapted to receive, position, and couple to modular jaws, brackets, or clamps (as described in further detail below). A stop 132 may also be coupled to another end of the slide 106 (opposite the end coupled to the second jaw mounting portions 130). The stop 132 may include a protrusion, hook, or other feature that restricts movement of the slide 106 out of the body 102. For example, when the slide 106 is moved in a direction out of the body 102, the stop 132 may contact or abut the fourth roller 126 to restrict movement of the slide 106 out of the body 102. The stop 132 may also be removable from the slide 106, to allow for removal of the slide 106 from the body 102 and/or replacement of the stop 132.

The slide 106 also includes a toothed portion 134 (such as a toothed plate) coupled to the slide 106 and facing in a direction towards the first side portion 112. The toothed portion 134 is coupled to the slide 106 via removable fasteners, such as, for example, screws, bolds, rivets, etc. This allows the toothed portion 134 to be removed and replaced, should teeth of the toothed portion 134 become damaged or worn.

The first side portion 112 may include a recess or pocket 136 adapted to receive one or more components of an adjustment mechanism of the vise 100. For example, the adjustment mechanism may include a housing 138 disposed in the recess or pocket 136 and a cover 140 disposed on the housing 138. However, the housing 138 may be integral (or a single monolithic piece) with the first side portion 112.

Figure 2:
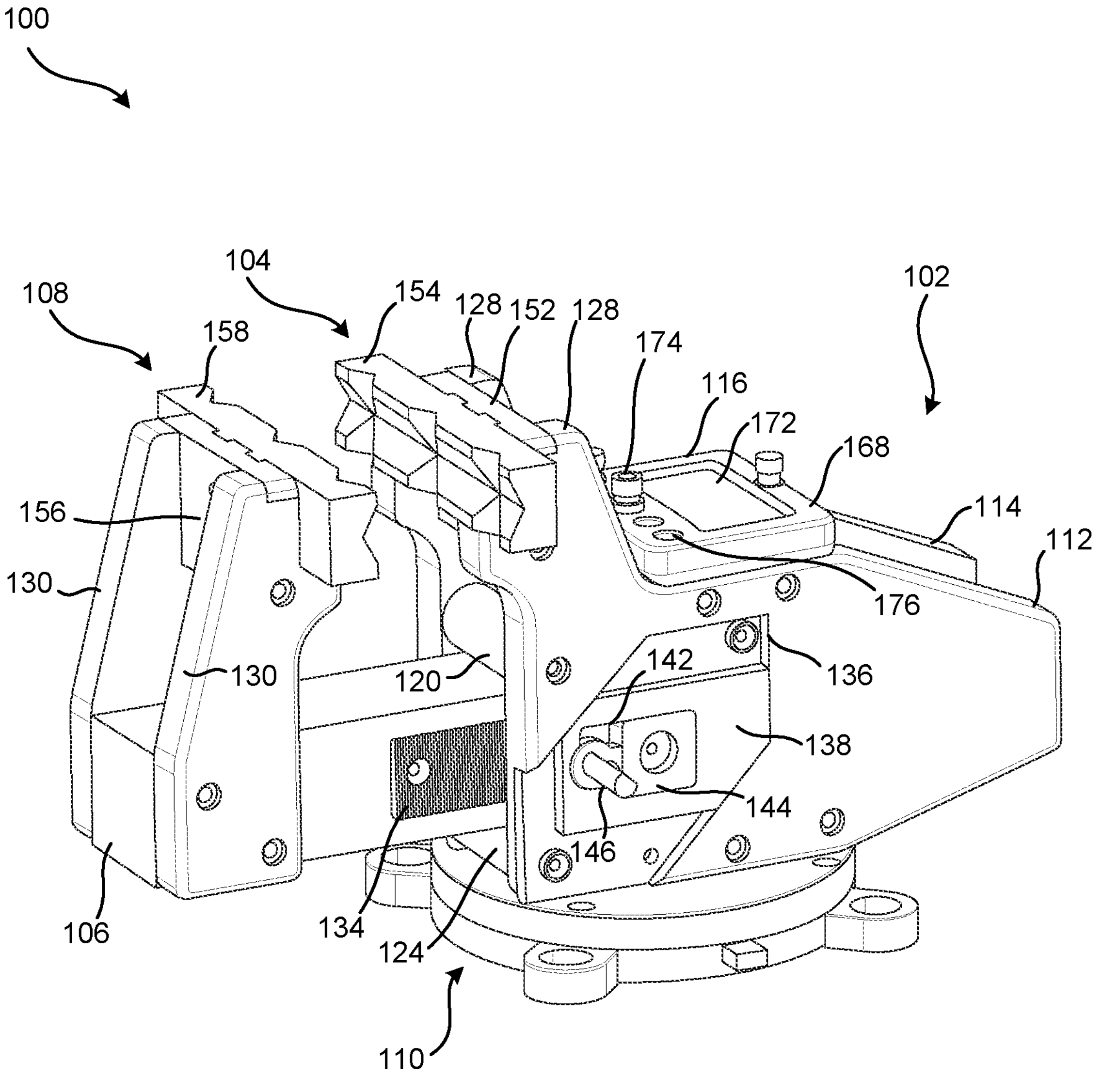
FIG. 2 is a perspective view of the vise of FIG. 1 with a side cover plate removed, according to an embodiment of the present invention.
Figure 3:
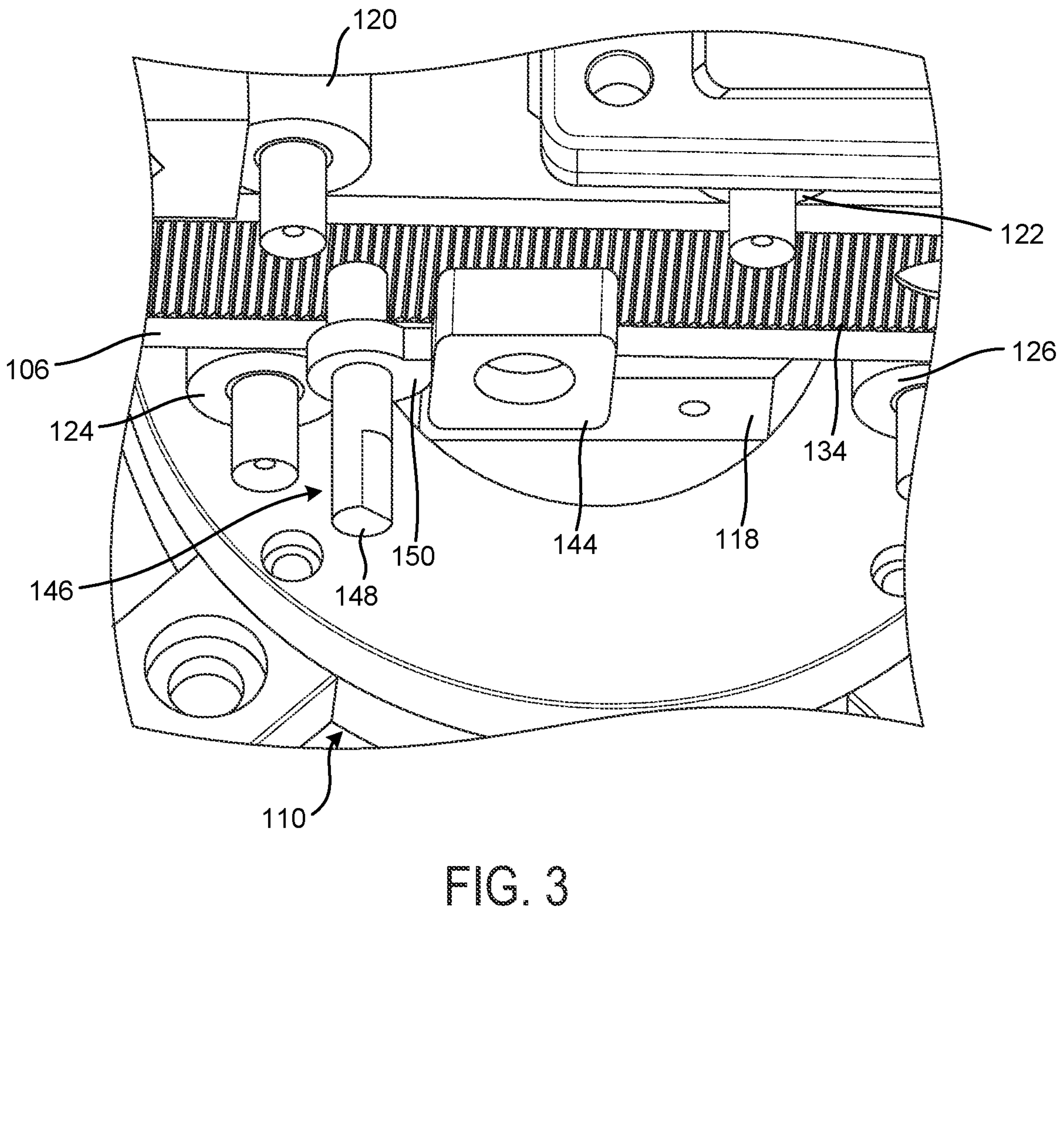
FIG. 3 is a perspective view of an adjusting mechanism of the vise of FIG. 1, according to an embodiment of the present invention.

Referring to FIGS. 2-4, the housing 138 includes a recess 142 adapted to receive a tooth block 144 and cam 146. The tooth block 144 and the toothed portion 134 coupled to the slide 106, each include teeth that meshingly mate with one another. The teeth on the tooth block 144 and the toothed portion 134 have, in an embodiment, a backdraft (i.e., are angled). The backdraft (i.e., angle) of the teeth allows the teeth to remain engaged when the cam 146 rotates and pushes the tooth block 144. The tooth block 144 may also be biased, such as via a spring, in a direction towards the toothed portion 134 coupled to the slide 106, and depression of a button may operatively cause the tooth block 144 to move in a direction away from the toothed portion 134. This allows the position of the slide 106 to be changed with respect to the body 102 (i.e., the slide 106 may be moved into or out of the body 102).

As shown in FIG. 3, the cam 146 includes a protrusion or shaft 148 adapted to mate with a handle or other tool to assist a user when rotating the cam 146. The shaft 148 extends from a radially extending shaped protrusion 150. The protrusion 150 includes a larger radially extending portion that reduces to a smaller radially extending portion, such that the tooth block 144 contacts the smaller radially extending portion, and as the cam 146 is rotated in a first rotational direction (such as in a clockwise direction shown in FIG. 3), the larger radially extending portion moves into contact with the tooth block 144 to gradually push the tooth block 144 in a direction laterally away from the cam 146 and into engagement with the toothed portion 134 coupled to the slide 106. Due to the engagement between the teeth of the tooth block 144 and the teeth of the toothed portion 134 coupled to the slide 106, rotation of the cam 146 in the first rotational direction also causes the tooth block 144 to move the slide 106 laterally and provide a clamping force between the first and second jaw portions 104, 108. Similarly, rotation of the cam 146 in a second rotational direction (such as in a counter-clockwise direction shown in FIG. 3), releases the tooth block 144 and slide 106, thereby reducing the clamping force between the first and second jaw portions 104, 108.

Figure 6:
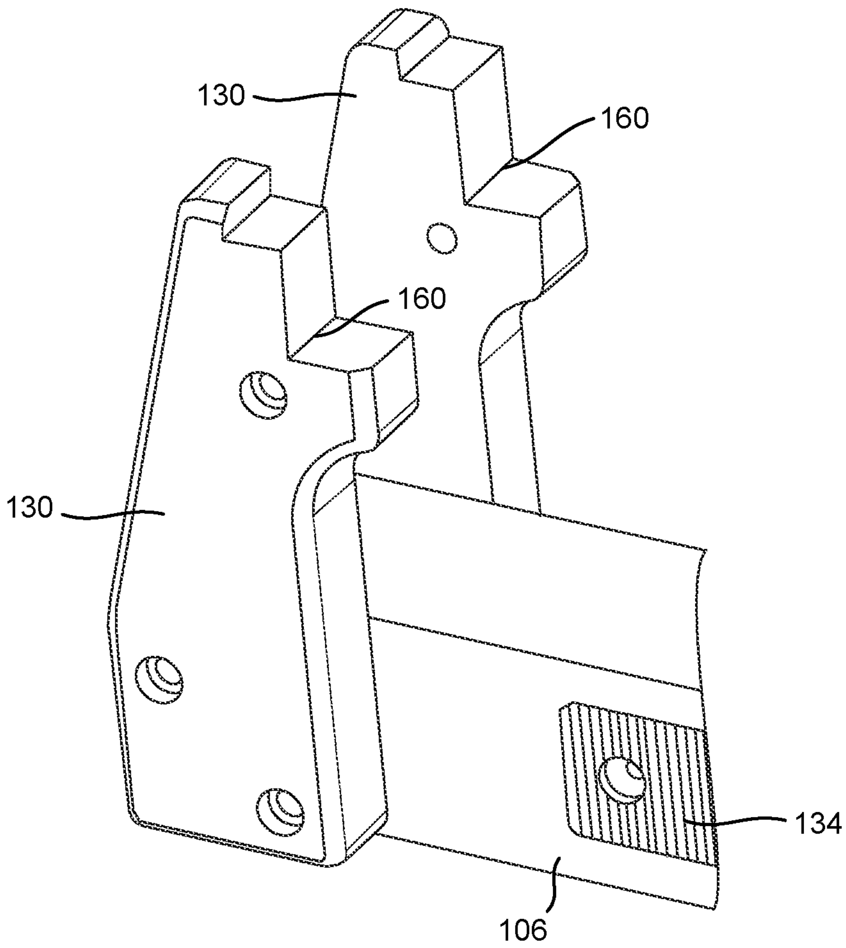
FIG. 6 is a perspective view of jaw arms of the vise, according to an embodiment of the present invention.
Figure 7:
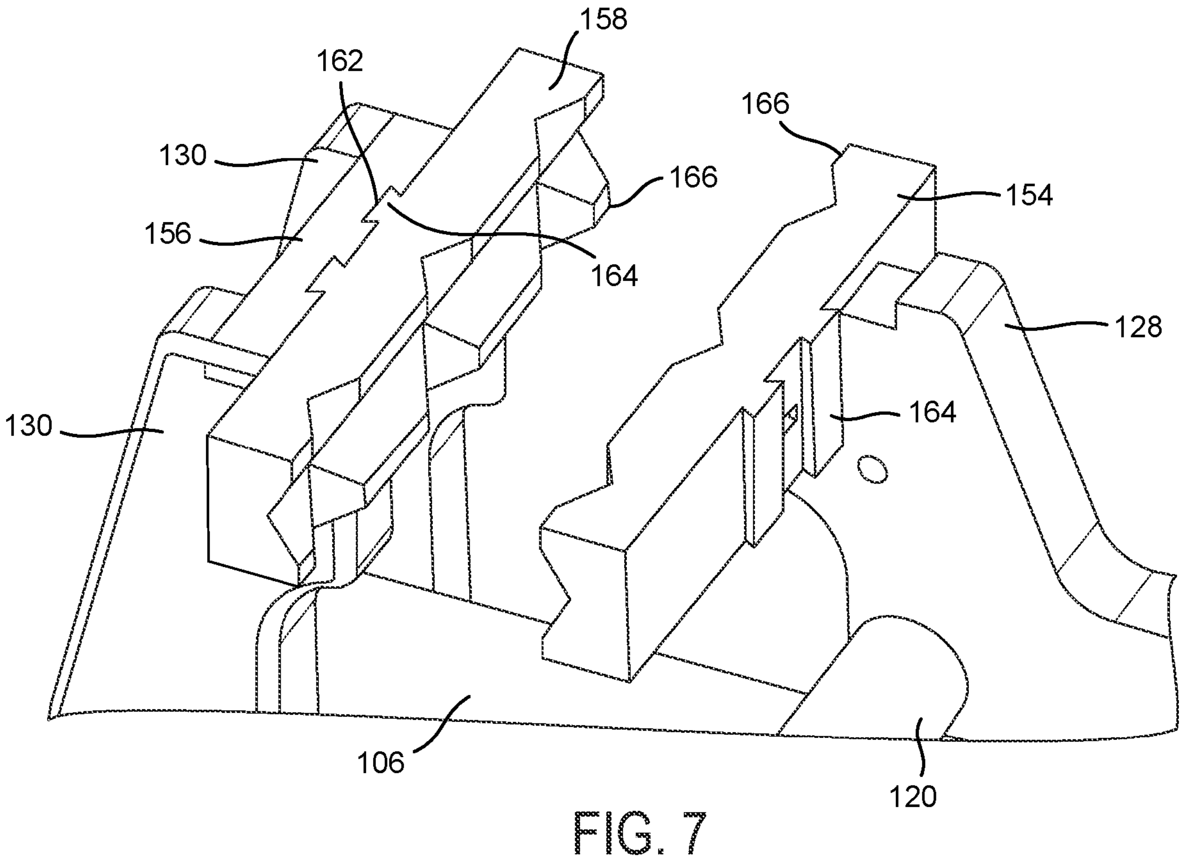
FIG. 7 is a perspective view of jaw plates and jaw gripping members of the vise, according to an embodiment of the present invention.
Figure 8:
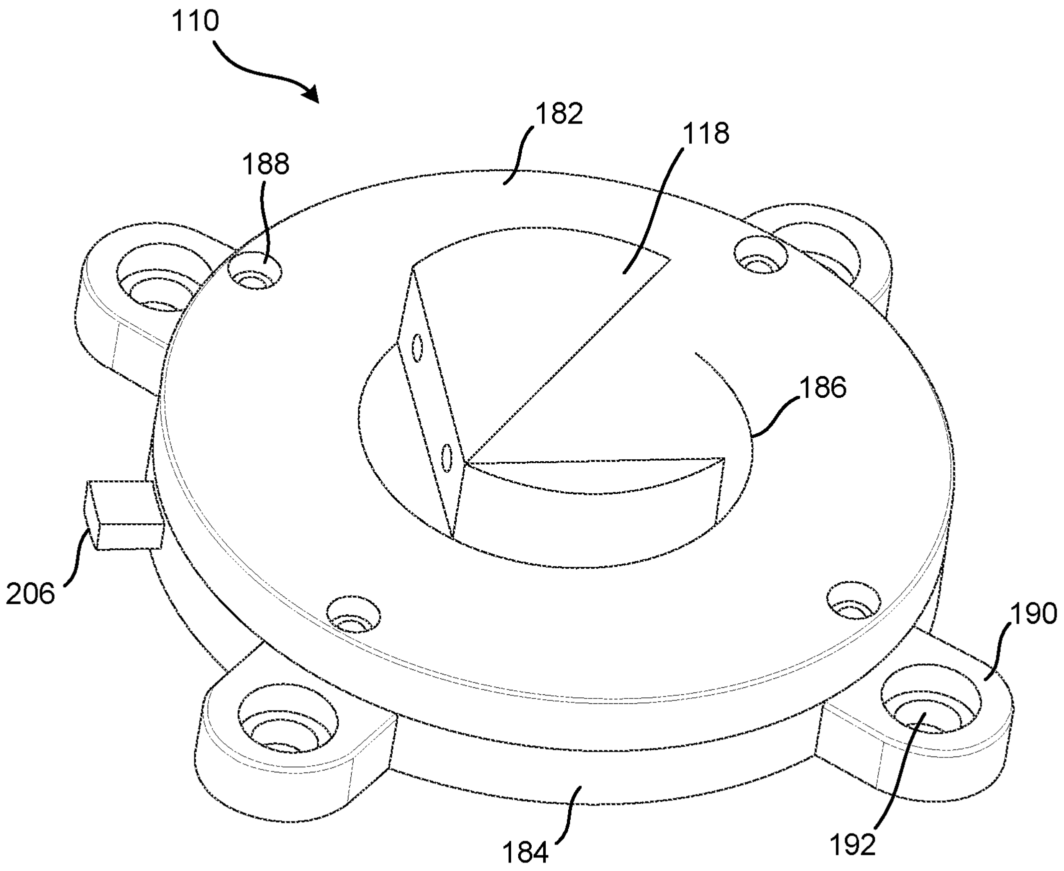
FIG. 8 is a perspective view of a base of the vise, according to an embodiment of the present invention.

Referring to FIGS. 1, 6 and 7, the first jaw portion 104 may include a first jaw plate 152 and a first jaw gripper 154. Similarly, the second jaw portion 108 may include a second jaw plate 156 and a second jaw gripper 158. Each of the first jaw mounting portions 128 and second jaw mounting portions 130 may include a notch 160 adapted to receive the respective first and second jaw plates 152, 156. Each of the first and second jaw plates 152, 156 may also include one or more slots 162, and each of the first and second jaw grippers 154, 158 may include corresponding one or more protrusions 164 adapted to mate with the one or more slots 162 and removably couple the first and second jaw grippers 154, 158 to the respective first and second jaw plates 152, 156. As shown, the slots 162 are dovetail type slots, and the protrusions 164 are dovetail type protrusions. However, other types of mating engagement can be used that allow for easy removal and replacement of the first and second jaw grippers 154, 158.

Each of the first and second jaw grippers 154, 158 may include gripping teeth 166. However, each of the first and second jaw grippers 154, 158 may have other shapes and geometries of teeth or grippers. For example, each of the first and second jaw grippers 154, 158 may include round or arcuate slots to hold bar stock, or other features adapted to hold various other shaped objects.

During operation, the slide 106 may be moved into or out of the body 102 to provide a desired distance between the first and second jaw grippers 154, 158. For example, an object may be disposed between the first and second jaw grippers 154, 158, and the slide 106 moved into the body 102 to reduce a distance between the first and second jaw grippers 154, 158, and thereby hold or clamp the object between the first and second jaw grippers 154, 158. To move the slide 106, the button described above may be depressed to cause the tooth block 144 to move in a direction away from the toothed portion 134, and allow the slide 106 to move with respect to the body 102. When the object is held or clamped between the first and second jaw grippers 154, 158, the button may be released to cause the tooth block 144 to move into engagement with the toothed portion 134.

To more securely hold or clamp the object between the first and second jaw grippers 154, 158, the cam 146 is rotated in the first rotational direction (such as in the clockwise direction) to cause the cam 146 to push the tooth block 144 in a direction laterally away from the cam 146. This lateral movement of the tooth block 144 also causes the slide 106 to move laterally into the body 102, and provide an increased clamping force between the first and second jaw grippers 154, 158. Similarly, rotation of the cam 146 in the second rotational direction (such as in a counter-clockwise direction), releases the tooth block 144 and slide 106, thereby allowing the slide 106 to move laterally out the body 102 and reduce the clamping force between the first and second jaw grippers 154, 158.

In addition to causing lateral movement of the tooth block 144, rotation of the cam 146 in the first rotational direction may cause movement of the tooth block 144 in a direction towards the toothed portion 134. In this example, the button described above may be removed, as rotation of the cam 146 in the first rotational direction moves of the tooth block 144 towards and into engagement with the toothed portion 134, and laterally away from the cam 146. Similarly, rotation of the cam 146 in the second rotational direction moves of the tooth block 144 away from and out of engagement with the toothed portion 134, and laterally towards from the cam 146.

Figure 5:
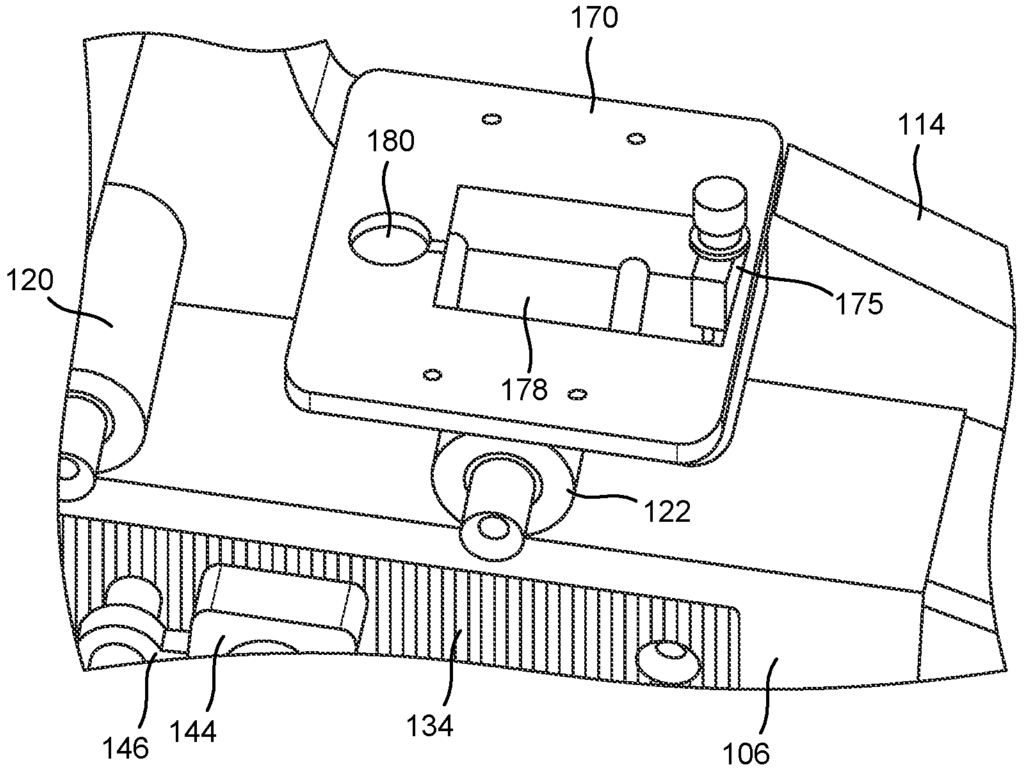
FIG. 5 is a perspective view of an optional tray that can be incorporated into the vise of FIG. 1, according to an embodiment of the present invention.

Referring to FIGS. 1 and 5, the top portion 116 coupled to the body 102 above the slide 106 may be removable and replaceable. For example, the top portion 116 may be a flat plate, a tray type portion, or other functional portion. As shown in FIGS. 1 and 5, the top portion 116 can be constructed of multiple components, such as a tray portion 168 disposed on a tray base portion 170. The tray portion 168 may be removable from the tray base portion 170, and include a recess 172 adapted to hold parts and other objects. The tray portion 168 may have locations adapted to affix attachment parts such as one or more posts 174 and an electrical socket 176. The top portion 116 may also include a light with a switch 175, and the tray base portion 170 may include a cavity 178 adapted to house a magnet and/or a battery. The tray base portion 170 may also have routing grooves or spaces 180 for electrical wiring or to receive magnets.

Referring to FIGS. 8-12, the base portion 110 includes the attachment portion 118 coupled to the first and second side portions 112, 114 to couple the body 102 to the base portion 110. The base portion 110 also includes a cover plate 182 and a base plate 184. The cover plate 182 includes an aperture 186 through which the attachment portion 118 extends, and is coupled to the base plate 184 via fasteners at fastener locations 188. The base plate 184 may be coupled to a substrate or work surface, for example a work bench or floor. In this regard, the base plate 184 may include taps 190 with apertures 192 adapted to receive fasteners, such as lag bolts or other type of fasteners adapted to couple the base plate 184 to the work surface.

Figure 9:
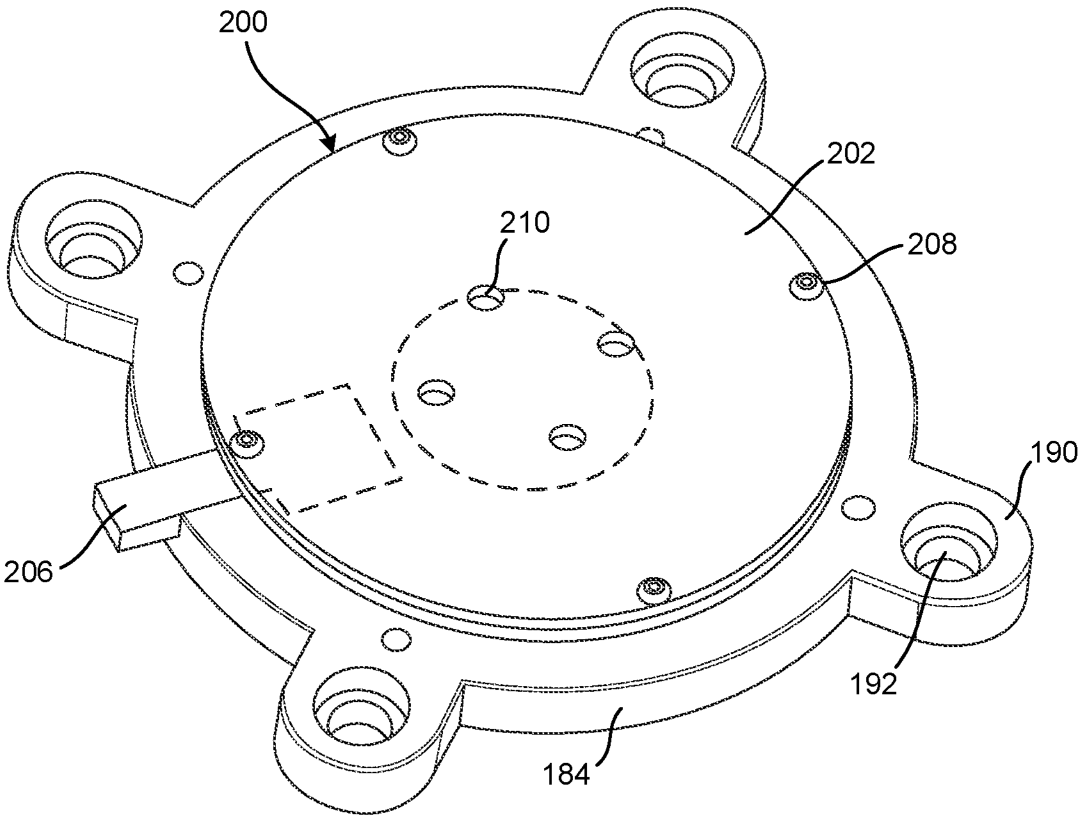
FIG. 9 is a perspective view of the base of the vise with a cover plate removed, according to an embodiment of the present invention.

Referring to FIGS. 9-12, the base portion 110 may also include a rotation mechanism 200 that allows the attachment portion 118 and the body 102 coupled to the attachment portion 118 to rotate relative to the base plate 184. The rotation mechanism 200 may be disposed between the cover plate 182 and the base plate 184. Referring to FIG. 9 (with the cover plate 182 removed), the rotation mechanism 200 includes an attachment plate 202, a gear ring 204, and a release lever 206. The attachment plate 202 is coupled to the gear ring 204 via one or more fasteners 208, and coupled to the attachment portion 118 via one or more fasteners that are received in fastener apertures 210. This allows the attachment plate 202, gear ring 204, and attachment portion 118 to rotate together.

Figure 10:
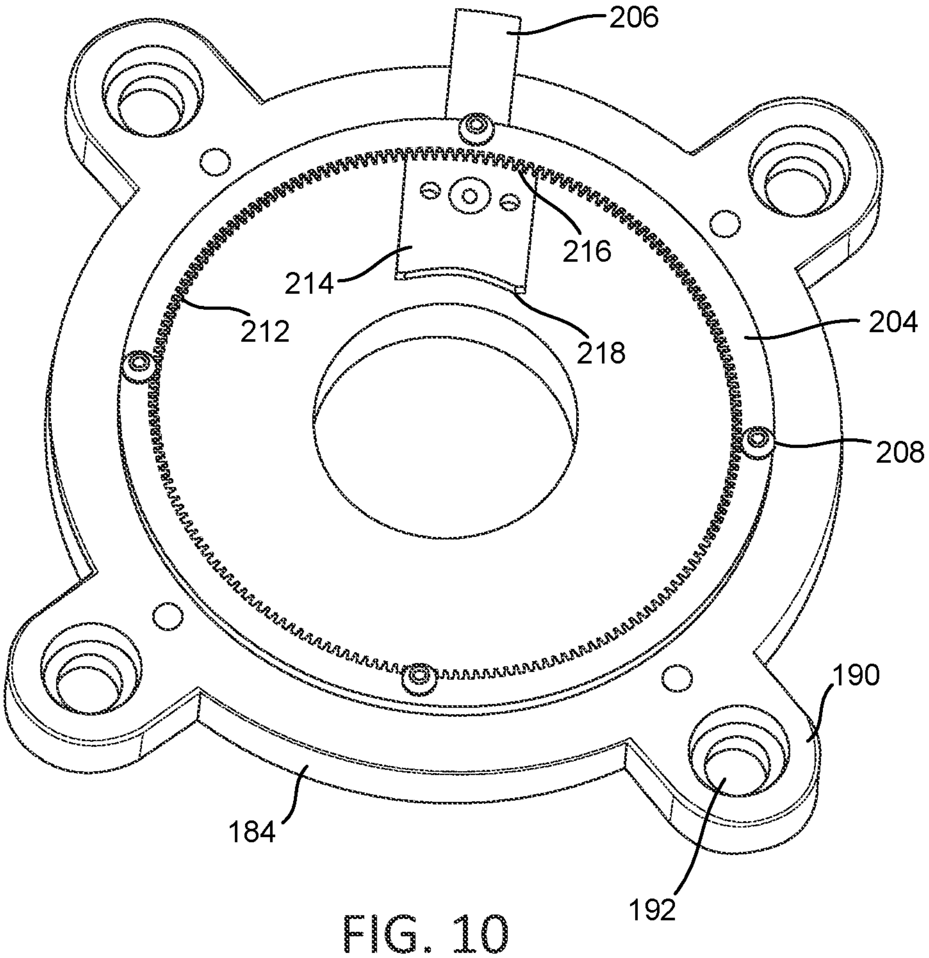
FIGS. 10-12 are perspective views of components of a rotation mechanism of the vise, according to an embodiment of the present invention.
Figure 11:
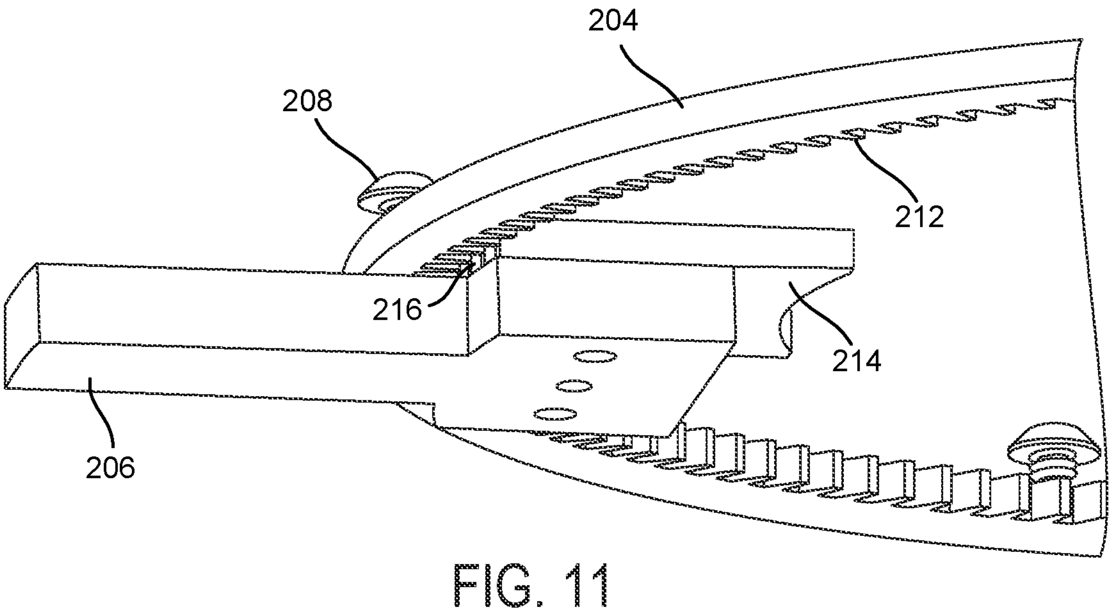
Figure 12:
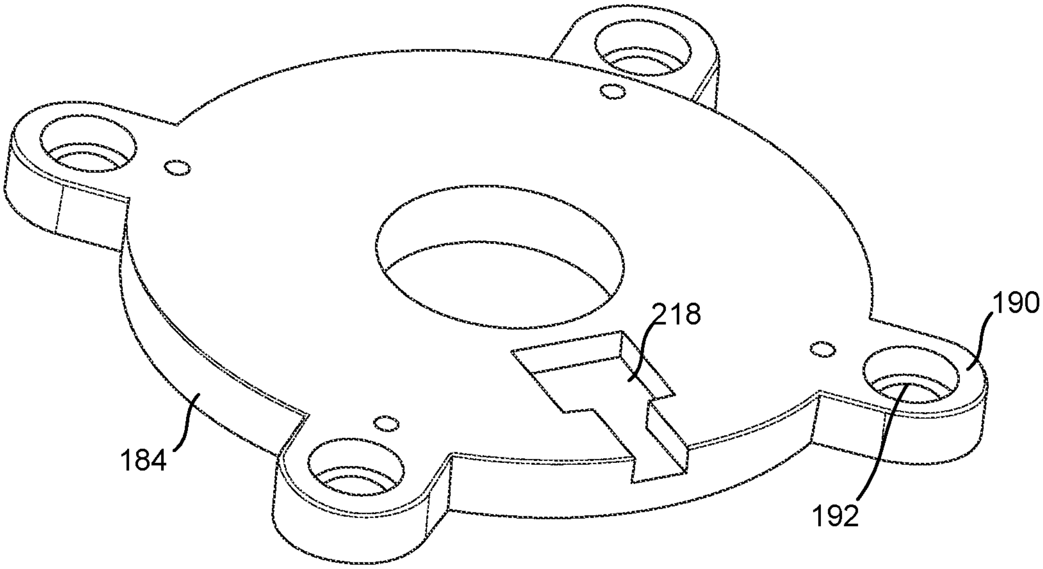

Referring to FIGS. 10 and 11, the gear ring 204 includes teeth 212 extending radially inwardly and disposed circumferentially around an inner surface of the gear ring 204. The release lever 206 is coupled to or includes a gear stop 214 with teeth 216 that mate with the teeth 212 of the gear ring 204. The gear stop 214 is disposed proximal to the inner surface of the gear ring 204, and the teeth 216 of the gear stop 214 protrude in a direction towards the teeth 212 of the gear ring 204. The release lever 206 also extends below the gear ring 204 and external to the base portion 110.

The gear stop 214 is also disposed in a recess 218 in the base plate 184, which allows for movement of the release lever 206 inwardly, thereby moving the teeth 216 of the gear stop 214 out of engagement with the teeth 212 of the gear ring 204. For example, the release lever 206 can be pushed inwardly with respect to the base plate 184 to disengage the teeth 216 of the gear stop 214 from the teeth 212 of the gear ring 204. In this disengaged position, the body 102 is allowed to rotate freely with respect to the base plate 184. When the body 102 is in a desired position, the user can pull the release lever 206 outwardly with respect to the base plate 184 to engage the teeth 216 of the gear stop 214 with the teeth 212 of the gear ring 204. In this engaged position, the body 102 is disallowed to rotate or locked in position with respect to the base plate 184.

The multicomponent or modular construction of the vise 100 allows the components to be disassembled, and removed/replaced if one or more of the components is damaged, worn, or otherwise fails. This modular construction also provides a vise 100 that is light weight compared to convention cast type vises, which allows for easier portability and manipulation.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A vise body, comprising:

a base portion;

first and second side portions removably coupled to the base portion;

a top portion removably coupled to the first and second side portions substantially opposite the base portion;

first and second rollers extending between the first and second side portions, and disposed between the base and top portions; and a jaw portion removably coupled to the first and second side portions.

2. The vise body of claim 1, wherein the base portion includes a rotatable attachment portion, and the first and second side portions are respectively removably coupled to opposing sides of the attachment portion.

3. The vise body of claim 1, wherein the jaw portion includes a jaw plate and a jaw gripper removably coupled to the jaw plate.

4. The vise body of claim 1, wherein the top portion includes a recess adapted to hold an object.

5. The vise body of claim 1, wherein the top portion includes a light.

6. The vise body of claim 1, wherein the top portion includes a cavity adapted to house a magnet or a battery.

7. The vise body of claim 6, wherein the top portion includes routing grooves for electrical wiring.

8. The vise body of claim 1, further comprising removable fasteners respectively coupling the first and second side portions to the base portion.

9. The vise body of claim 1, wherein the base portion includes a base plate.

10. The vise body of claim 9, wherein the base portion includes a cover plate coupled to the base plate.

11. The vise body of claim 10, wherein the base portion includes a gear ring disposed between the base plate and the cover plate, and including gear teeth extending inwardly from an inner surface of the gear ring.

12. The vise body of claim 11, wherein the base portion includes a lever including a gear stop with stop teeth adapted to engage the gear teeth.

13. The vise body of claim 12, wherein the base portion includes an attachment portion coupled to the gear ring and extending through the cover plate, and wherein the first and second side portions are respectively removably coupled to opposing sides of the attachment portion, and the attachment portion and gear ring are rotatable together with respect to the base plate when the stop teeth are disengaged from the gear teeth.

* * * * *